United States Patent [19]

Makino et al.

[11] 4,255,543
[45] Mar. 10, 1981

[54] PROCESS FOR THE PREPARATION OF 1,2-POLYBUTADIENE

[75] Inventors: Kenya Makino, Kuwana; Toshio Miyabayashi, Yokkaichi; Noboru Ohshima, Yokkaichi; Yasumasa Takeuchi, Yokkaichi, all of Japan

[73] Assignee: Japan Synthetic Rubber Co., Ltd., Tokyo, Japan

[21] Appl. No.: 66,698

[22] Filed: Aug. 15, 1979

[30] Foreign Application Priority Data

Aug. 21, 1978 [JP] Japan ............... 53-100969

[51] Int. Cl.$^3$ .............................................. C08F 4/70
[52] U.S. Cl. ...................... 526/92; 260/33.6 A; 526/93; 526/335
[58] Field of Search ...................... 526/93, 92

[56] References Cited

U.S. PATENT DOCUMENTS

| | | | |
|---|---|---|---|
| 3,498,963 | 3/1970 | Ichikawa et al. | 526/92 |
| 3,522,332 | 7/1970 | Ichikawa et al. | 526/93 |

FOREIGN PATENT DOCUMENTS 46-31337  9/1971  Japan.
47-8211   3/1972  Japan.

Primary Examiner—Stanford M. Levin
Attorney, Agent, or Firm—Oblon, Fisher, Spivak, McClelland & Maier

[57] ABSTRACT

In the preparation of 1,2-polybutadiene with a vinyl content of at least 70% by contacting 1,3-butadiene with a catalyst consisting of:

(A) a cobalt compound,
(B) an organic phosphine compound,
(C) a trialkylaluminum compound, and
(D) water in an amount of 0.1 to 1.2 moles per mole of said trialkylaluminum, in the presence of a molecular weight regulator, (E) an alkylaluminum halide compound is used as the molecular weight regulator in an amount of at least 0.01 mole per mole of the trialkylaluminum compound (C), whereby 1,2-polybutadiene with a regulated molecular weight can be produced without causing decreased polymerization activity and change of vinyl content and crystallinity of the produced polymer. The alkylaluminum halide compound (E) is preferably used in an amount of 0.05 to 1.0 mole per mole of the trialkylaluminum compound (C).

6 Claims, No Drawings

PROCESS FOR THE PREPARATION OF 1,2-POLYBUTADIENE

This invention relates to a process for the preparation of 1,2-polybutadiene with a high vinyl content and a regulated molecular weight.

1,2-Polybutadiene is used for a wide variety of uses such as production of rubber and resin materials. The molecular weight of 1,2-polybutadiene is a decisive factor for the physical and mechanical properties as well as processability of this compound. It is therefore highly desirable that a 1,2-polybutadiene having the optimum molecular weight for the purpose of use can freely be produced.

It is already known that 1,2-polybutadiene with a high vinyl content can be obtained by using a catalyst consisting of (A) a cobalt compound, (B) an organic phosphine compound, (C) a trialkylaluminum compound and (D) water (U.S. Pat. No. 3,498,963). It is also known that the molecular weight can be regulated by adding molecular hydrogen to said catalyst (Japanese Patent Publication No. 8211/72) or adding a thioether to said catalyst (Japanese Patent Publication No. 31,337/71). According to these prior art techniques, the molecular weight of the produced 1,2-polybutadiene can be regulated to some extent by adjusting the amount of catalyst, catalyst preparation conditions, monomer concentration and polymerization temperature. In the method in which molecular hydrogen is added, it is possible to attain a molecular weight lowering effect by performing the polymerization under hydrogen pressure.

However, these conventional methods are not always advantageous for adjustment of the molecular weight of 1,2-polybutadiene in respect of the properties of 1,2-polybutadiene produced, the polymerization activity of the catalyst and safety in the production process. Particularly, these methods often lower the polymerization activity. The method using hydrogen is not necessarily advantageous for adjustment of molecular weight because the hydrogen solubility in a solvent is reduced in the process of production under low pressure.

As a result of further studies on a method of regulating the molecular weight of 1,2-polybutadiene, the present inventors have found that it is possible to produce 1,2-polybutadiene with a regulated molecular weight and a high vinyl content without causing decreased polymerization activity and change of the vinyl content and crystallinity of the produced polymer by polymerizing 1,3-butadiene with a four-component catalyst comprising (A) a cobalt compound, (B) an organic phosphine compound, (C) a trialkylaluminum compound and (D) water in the presence of (E) an alkylaluminum halide compound.

An object of this invention is to provide a process for the preparation of 1,2-polybutadiene with a regulated molecular weight.

Another object of this invention is to provide a process for the preparation of 1,2-polybutadiene with a high vinyl content and a regulated molecular weight.

Other objects and advantages of this invention will become apparent from the following description.

According to this invention, there is provided a process for preparing 1,2-polybutadiene with a regulated molecular weight and a vinyl content of at least 70% by contacting 1,3-butadiene with a catalyst consisting of:

(A) a cobalt compound,
(B) an organic phosphine compound,
(C) a trialkylaluminum compound, and
(D) water in an amount of 0.1 to 1.2 moles per mole of said trialkylaluminum, in the presence of a molecular weight regulator, characterized in that as the molecular weight regulator (E) an alkylaluminum halide compound is allowed to be present in the reaction system in an amount of at least 0.01 mole per mole of the trialkylaluminum compound (C).

Use of the process of this invention enables the production of a polymer with a regulated molecular weight by using a smaller amount of a cobalt compound than where no molecular weight regulator (E) is used.

The component (A) (a cobalt compound) of the catalyst used in this invention may be suitably selected from the group of cobalt compounds having apparent valences ranging from zero to the maximal. Typical examples of such compounds include cobalt halides, phosphates, nitrates, carbonates, sulfates, hydroxides, cyanides, thiocyanides, naphthenates, octenoates, octanoates, etc., and cobalt complexes having, as the ligand, carbonyl, isonitrile, vinyl compound, cyclopentanedienyl, $\pi$-allyl or derivatives thereof, acetylacetone, acetoacetic acid and the like. Preferred examples of such cobalt compounds include cobalt chloride, cobalt bromide, cobalt iodide, cobalt naphthenate, cobalt octenoate, cobalt octanoate, cobalt stearate, cobalt thiocyanide, cobalt nitrate, cobalt sulfate, cobalt acetate, cobalt tris(acetyl acetonate), cobalt bis(acetyl acetonate), cobalt carbonyl, and the like.

The component (B) is selected from the compounds represented by the general formula: P—(R)$_3$, wherein R is an alkyl, cycloalkyl or aryl group, and the examples of such compounds include triethylphosphine, triisopropylphosphine, tri-n-butylphosphine, triphenylphosphine, tri-m-tolylphosphine, tri-m-xylylphosphine, tri-m-phenylphenylphosphine and tricyclohexylphosphine. This component (B) may not be used when there is used, as the component (A), a complex having an organic phosphine compound as its ligand, for example, cobalt bis(triethylphosphine) dichloride, cobalt bis(triethylphosphine) dibromide, cobalt bis(triphenylphosphine) dichloride, cobalt bis(triphenylphosphine) dibromide, cobalt bis(tri-m-tolylphosphine) dichloride, cobalt bis(tri-m-tolylphosphine) dibromide, cobalt bis(tri-m-xylylphosphine) dichloride, cobalt bis(tri-m-xylylphosphine) dibromide, cobalt bis(triphenylphosphine) octanoate, cobalt bis(tri-m-tolylphosphine) octanoate, cobalt bis(tri-phenylphosphine) naphthenate, cobalt bis(tri-m-tolylphosphine) naphthenate, or the like.

Examples of the component (C) include trimethylaluminum, triethylaluminum, triisobutylaluminum, trihexylaluminum and the like.

The component (E) is selected from the halogenated alkylaluminum compounds represented by the general formula: AlR$_{3-n}$X$_n$, wherein R is an alkyl group, X is a halogen, and n is a number defined by $1 \leq n \leq 2$. As examples of such compounds, there may be exemplified dimethylaluminum chloride, diethylaluminum chloride, diethylaluminum bromide, diethylaluminum iodide, diisobutylaluminum chloride, dihexylaluminum chloride, ethylaluminum sesquichloride, ethylaluminum sesquibromide, ethylaluminum dichloride and ethylaluminum dibromide.

The catalyst of this invention can be prepared by mixing the components (A) to (E) in a random order in an aromatic hydrocarbon or halogenated hydrocarbon solvent, but preferably said components are added in the order of trialkylaluminum, alkylaluminum halide, water, organic phosphine compound and cobalt compound in the presence or absence of 1,3-butadiene, or by contacting in the order of trialkylaluminum, water, alkylaluminum halide, organic phosphine compound and cobalt compound in the presence or absence of 1,3-butadiene.

The temperature used for the catalyst preparation, although not critical, is preferably within the range of −20° to 50° C.

The mixing ratio between the component (A) (cobalt compound) and the component (C) (trialkylaluminum compound) is 1 to 200 moles, preferably about 5 to 100 moles, of trialkylaluminum compound per mole of the cobalt compound. The optimum ratio is determined depending on the molecular weight of the polymer to be obtained. The greater the proportion of the cobalt compound, the lower the molecular weight of the produced 1,2-polybutadiene.

The amount of water added as component (D) for the preparation of the catalyst of this invention is within the range of 0.1 to 1.2 moles per mole of the trialkylaluminum compound which is the component (C) of the catalyst. If the amount of water is less than 0.1 mole or more than 1.2 moles, per mole of the trialkylaluminum compound, the polymerization activity is nothing at all or excessively low.

The amount of water referred to herein means the total amount of water existing in the whole polymerization system.

The component (B), namely the organic phosphine compound, is used in an amount of 0.5 to 50 moles, preferably 1.0 to 20 moles, per mole of the component (A), namely the cobalt compound. If the amount of the organic phosphine compound added is less than 0.5 moles, it is impossible to obtain 1,2-polybutadiene with a vinyl content of at least 70%, and if said amount exceeds 50 moles, no desired polymerization activity is obtained.

The component (B) may not be used where the component (A) is a complex having an organic phosphine compound as its ligand.

The amount of the alkylaluminum halide compound (E) used as the molecular weight regulator in this invention is 0.01 to 1.5 moles, preferably 0.05 to 1.0 mole, per mole of the trialkylaluminum which is the component (C) of the catalyst. If the amount is less than 0.01 mole, no required molecular weight regulating effect is exhibited, and if the amount exceeds 1.5 moles, the vinyl content in the polymer obtained becomes low.

The amount of the catalyst used in the process of this invention is about 0.001 to 1 millimole, usually 0.01 to 0.5 millimole, in terms of the cobalt compound, per mole of 1,3-butadiene. The polymerization temperature is usually within the range of −20° to 100° C., preferably −10° to 70° C. The pressure to be applied for the polymerization is not critical and any pressure sufficient to maintain the reaction mixture substantially in a liquid phase may be used.

The hydrocarbon or halogenated hydrocarbon solvent used for the polymerization reaction or for the catalyst preparation may be selected from aliphatic hydrocarbons such as n-pentane, n-hexane, n-heptane, isooctane, etc., alicyclic hydrocarbons such as cyclohexane, decahydronaphthalene, methylcyclopentane, etc., aromatic hydrocarbons such as benzene, toluene, xylene, cumene, etc., and halogenated hydrocarbon compounds such as methylene chloride, chloroform, ethylene tetrachloride, trichloroethylene, perchloroethylene, chlorobenzene, chlorotoluene, etc. Most preferred among them are the halogenated hydrocarbon compounds such as methylene chloride, ethylene tetrachloride, trichloroethylene, perchloroethylene, chlorobenzene, etc.

The invention is explained below in further detail referring to Examples which are by way of illustration and not by way of limitation.

In the following Examples, the intrinsic viscosity $[\eta]$ of the polymer was measured at 30° C. in toluene. The micro-structure of the polymer was determined by means of infrared absorption spectrum, and the crystallinity was measured according to the density-gradient tube method by setting the density of 1,2-polybutadiene of 0% crystallinity at 0.892 g/cm$^3$ and the density of 1,2-polybutadiene of 100% crystallinity at 0.963 g/cm$^3$.

EXAMPLES 1 TO 6 AND COMPARATIVE EXAMPLES 1 TO 3

Into a 100-ml pressure bottle were charged 72 g of methylene chloride, 0.060 millimole of water (actually, methylene chloride containing 900 ppm of water was used in the present and other Examples), 6 g of 1,3-butadiene, predetermined amounts (shown in Table 1) of a mixture of triisobutylaluminum and diethylaluminum chloride (previously mixed at 25° C. for 1 hour), and 0.006 millimole of cobalt bis(tri-m-xylylphosphine) dibromide in this order in a nitrogen atmosphere and the resulting mixture was subjected to polymerization at 5° C. for one hour. In Comparative Example 1, triisobutylaluminum was used alone instead of the mixture of triisobutylaluminum and diethylaluminum chloride.

To the polymer solution was added methanol containing 2,6-di-tert-butyl-p-cresol to terminate the polymerization, and then the polymer solution was poured into 500 ml of methanol containing a small quantity of hydrochloric acid to coagulate the polymer. Subsequently, the polymer was vacuum-dried overnight at 40° C. The results are shown in Table 1.

TABLE 1

| | Al(i-Bu)$_3$ (M mole) | AlEt$_2$Cl (M mole) | AlEt$_2$Cl Total Al* (molar ratio) | Conversion (%) | $[\eta]_{30°C.}^{TL}$ (dl/g) | Vinyl content (%) | Crystallinity (%) |
|---|---|---|---|---|---|---|---|
| Example 1 | 0.114 | 0.006 | 0.05 | 85 | 2.75 | 93.7 | 32.6 |
| Example 2 | 0.108 | 0.012 | 0.10 | 88 | 2.69 | 92.1 | 33.1 |
| Example 3 | 0.096 | 0.024 | 0.20 | 84 | 2.10 | 92.8 | 32.6 |
| Example 4 | 0.084 | 0.036 | 0.30 | 82 | 1.70 | 92.8 | 33.0 |
| Example 5 | 0.072 | 0.048 | 0.40 | 80 | 1.50 | 91.0 | 33.3 |
| Example 6 | 0.060 | 0.060 | 0.50 | 65 | 1.30 | 85.0 | 33.0 |
| Comparative Example 1 | 0.120 | 0 | 0 | 85 | 3.49 | 94.8 | 32.4 |

TABLE 1-continued

|  | Al(i-Bu)$_3$ (M mole) | AlEt$_2$Cl (M mole) | AlEt$_2$Cl / Total Al* (molar ratio) | Results of polymerization | | | |
|---|---|---|---|---|---|---|---|
|  |  |  |  | Conversion (%) | $[\eta]_{30°C.}^{TL}$ (dl/g) | Vinyl content (%) | Crystallinity (%) |
| Comparative Example 2 | 0.042 | 0.078 | 0.65 | 60 | 1.32 | 62.0 | — |
| Comparative Example 3 | 0.024 | 0.096 | 0.8 | 96 | 2.50 | 7.0 | — |

Note:
*Total Al: Sum of Al(i-Bu)$_3$ and AlEt$_2$Cl (Same applies in TABLES 2 and 3)

EXAMPLES 7 TO 10

Into a 100-ml pressure bottle were charged 72 g of methylene chloride, 0.060 millimole of water, 6 g of 1,3-butadiene, a mixture of 0.084 millimole of triisobutylaluminum and 0.036 millimole of diethylaluminum chloride (previously mixed at 25° C. for one hour), and predetermined amounts (shown in Table 2) of cobalt bis(triphenylphosphine) dibromide in this order in a nitrogen atmosphere, and the resulting mixture was subjected to polymerization at 10° C. for one hour. The results are shown in Table 2.

COMPARATIVE EXAMPLES 4 TO 7

Polymerization reactions were carried out in the same manner as in Examples 7 to 10, except that 0.120 millimole of triisobutylaluminum was substituted for the mixture of triisobutylaluminum and diethylaluminum chloride, thereby obtaining the results shown in Table 2.

TABLE 2

|  | Al(i-Bu)$_3$ (M mole) | AlEt$_2$Cl (M mole) | AlEt$_2$Cl / Total Al (molar ratio) | Amount of cobalt compound (M mole) | Total Al Co (molar ratio) | Results of polymerization | | | |
|---|---|---|---|---|---|---|---|---|---|
|  |  |  |  |  |  | Conversion (%) | $[\eta]_{30°C.}^{TL}$ (dl/g) | Vinyl content (%) | Crystallinity (%) |
| Example 7 | 0.084 | 0.036 | 0.3 | 0.008 | 15 | 100 | 0.43 | 94.0 | 24.2 |
| Comparative Example 4 | 0.120 | 0 | 0 | 0.008 | 15 | 100 | 0.86 | 94.1 | 24.0 |
| Example 8 | 0.084 | 0.036 | 0.3 | 0.006 | 20 | 100 | 0.76 | 94.0 | 23.9 |
| Comparative Example 5 | 0.120 | 0 | 0 | 0.006 | 20 | 100 | 1.38 | 94.0 | 23.5 |
| Example 9 | 0.084 | 0.036 | 0.3 | 0.0048 | 25 | 99 | 0.87 | 92.9 | 23.4 |
| Comparative Example 6 | 0.120 | 0 | 0 | 0.0048 | 25 | 99 | 2.06 | 93.0 | 23.3 |
| Example 10 | 0.084 | 0.036 | 0.3 | 0.0040 | 30 | 91 | 0.90 | 93.6 | 23.8 |
| Comparative Example 7 | 0.120 | 0 | 0 | 0.0040 | 30 | 91 | 2.19 | 94.0 | 23.5 |

EXAMPLES 11 and 12

Into a 100-ml pressure bottle were charged 72 g of methylene chloride, 6 g of 1,3-butadiene, 0.084 millimole of triisobutylaluminum, 0.060 millimole of water, 0.036 millimole of diethylaluminum chloride and predetermined amounts (shown in Table 3) of cobalt bis(trim-tolylphosphine) dibromide in this order in a nitrogen atmosphere, and the resulting mixture was subjected to polymerization at 10° C. for one hour. The results are shown in Table 3.

COMPARATIVE EXAMPLES 8 AND 9

The procedure of Examples 11 or 12 was repeated, except that 0.120 millimole of triisobutyl-aluminum was substituted for the triisobutylaluminum and diethylaluminum chloride, thereby obtaining the results shown in Table 3.

TABLE 3

|  | Al(i-Bu)$_3$ (M mole) | AlEt$_2$Cl (M mole) | AlEt$_2$Cl / Total Al (molar ratio) | Amount of cobalt compound (M mole) | Total Al Co (molar ratio) | Results of polymerization | | | |
|---|---|---|---|---|---|---|---|---|---|
|  |  |  |  |  |  | Conversion (%) | $[\eta]_{30°C.}^{TL}$ (dl/g) | Vinyl content (%) | Crystallinity (%) |
| Example 11 | 0.084 | 0.036 | 0.3 | 0.008 | 14 | 100 | 0.64 | 93.0 | 27.8 |
| Comparative Example 8 | 0.120 | 0 | 0 | 0.008 | 15 | 100 | 1.06 | 93.1 | 27.9 |
| Example 12 | 0.084 | 0.036 | 0.3 | 0.0048 | 25 | 96 | 1.07 | 92.0 | 27.7 |
| Comparative | 0.120 | 0 | 0 | 0.0048 | 25 | 100 | 2.39 | 93.8 | 27.9 |

EXAMPLES 13 AND 14

Into a 100-ml pressure bottle were charged 72 g of methylene chloride, 0.060 millimole of water, 6 g of 1,3-butadiene, a predetermined amount (Table 4) of a mixture of triisobutylaluminum and ethylaluminum sesquichloride (previously mixed at 25° C. for one hour) and 0.006 millimole of cobalt bis(tri-m-xylylphosphine) dichloride in this order in a nitrogen atmosphere and the resulting mixture was subjected to polymerization at 5° C. for one hour. The results are shown in Table 4.

COMPARATIVE EXAMPLE 10

Polymerization reaction was carried out in the same manner as in Example 13 or 14, except that 0.120 millimole of triisobutylaluminum was substituted for the mixtures of triisobutylaluminum and ethylaluminum sesquichloride, thereby obtaining the results shown in Table 4.

EXAMPLE 15

Into a 300-ml pressure bottle were charged 160 g of chlorobenzene, 0.202 millimole of water, 20 g of 1,3-butadiene, 0.343 millimole of triethylaluminum, 0.061 millimole of ethylaluminum dichloride, 0.0202 millimole of cobalt octanoate and 0.0606 millimole of triphenylphosphine in this order in a nitrogen atmosphere and the resulting mixture was subjected to polymerization at 10° C. for one hour. The results obtained are shown in Table 5.

COMPARATIVE EXAMPLE 11

The procedure of Example 15 was repeated, except that 0.404 millimole of triethylaluminum was substituted for the triethylaluminum and ethylaluminum dichloride, thereby obtaining the results shown in Table 5.

TABLE 5

| | $AlEt_3$ (M mole) | $AlEtCl_2$ (M mole) | $\frac{AlEtCl_2}{\text{Total Al}^*}$ (molar ratio) | Amount of cobalt compound (M mole) | Conversion (%) | $[\eta]_{30°C.}^{TL}$ (dl/g) | Vinyl content (%) | Crystallinity (%) |
|---|---|---|---|---|---|---|---|---|
| Example 15 | 0.343 | 0.061 | 0.15 | 0.0202 | 99 | 1.03 | 92 | 17.2 |
| Comparative Example 11 | 0.404 | 0 | 0 | 0.0202 | 99 | 1.50 | 92 | 17.4 |

Note:
*Total Al means the sum of $AlEt_3$ and $AlEtCl_2$.

EXAMPLES 16 TO 20 AND COMPARATIVE EXAMPLES 12 AND 13

Into a 300-ml pressure bottle were charged 210 g of methylene chloride, a predetermined amount of water (shown in Table 6), 30 g of 1,3-butadiene, a mixture of 0.224 millimole of triisobutylaluminum and 0.096 millimole of diethylaluminum chloride (previously mixed at 25° C. for 10 minutes), and 0.0128 millimole of cobalt bis(tri-m-tolylphosphine) dibromide in this order in a nitrogen atmosphere and the resulting mixture was subjected to polymerization at 10° C. for 30 minutes and the effect of the water/organic aluminum ratio was examined. The results are shown in Table 6.

TABLE 4

| | $Al(i\text{-}Bu)_3$ (M mole) | $AlEt_{1.5}Cl_{1.5}$ (M mole) | $\frac{AlEt_{1.5}Cl_{1.5}}{\text{Total Al}^*}$ (molar ratio) | Amount of cobalt compound (M mole) | Total Al Co (molar ratio) | Conversion (%) | $[\eta]_{30°C.}^{TL}$ (dl/g) | Vinyl content (%) | Crystallinity (%) |
|---|---|---|---|---|---|---|---|---|---|
| Example 13 | 0.114 | 0.006 | 0.05 | 0.006 | 20 | 95 | 2.58 | 92.6 | 33.8 |
| Example 14 | 0.108 | 0.012 | 0.1 | 0.006 | 20 | 95 | 2.09 | 91.9 | 33.5 |
| Comparative Example 10 | 0.120 | 0 | 0 | 0.006 | 20 | 89 | 3.22 | 94.5 | 33.7 |

Note:
*Total Al means the sum of $Al(i\text{-}Bu)_3$ and $AlEt_{1.5}Cl_{1.5}$.

TABLE 6

| | $H_2O$ (M mole) | $H_2O/Al$ (molar ratio) | Results of polymerization | | |
|---|---|---|---|---|---|
| | | | Conversion (%) | Vinyl content (%) | $[\eta]_{30°C.}^{TL}$ (dl/g) |
| Example 16 | 0.128 | 0.4 | 59 | 92 | 1.21 |
| Example 17 | 0.160 | 0.5 | 56 | 92 | 1.23 |
| Example 18 | 0.192 | 0.6 | 76 | 92 | 1.21 |
| Example 19 | 0.224 | 0.7 | 76 | 92 | 1.24 |
| Example 20 | 0.256 | 0.8 | 84 | 92 | 1.24 |
| Comparative Example 12 | 0.416 | 1.3 | 2 | — | — |
| Comparative Example 13 | 0.016 | 0.05 | 7 | — | — |

COMPARATIVE EXAMPLE 14

The same procedure as in Comparative Example 6 was repeated, except that 0.036 millimole of dimethyl thioether was added prior to the addition of the cobalt compound, to obtain the result shown in Table 7.

COMPARATIVE EXAMPLE 15

The same procedure as in Comparative Example 6 was repeated, except that 0.036 millimole of hydrogen was added prior to the addition of the cobalt compound, to obtain the result shown in Table 7.

TABLE 7

| | Al(i-Bu)$_3$ (M mole) | Kind and amount of molecular weight regulator | | Regulator Total Al (molar ratio) | Results of polymerization | | | |
|---|---|---|---|---|---|---|---|---|
| | | Kind | (M mole) | | Conversion (%) | $[\eta]_{30°C.}^{TL}$ (dl/g) | Vinyl content (%) | Crystallinity (%) |
| Example 9 | 0.084 | AlEt$_2$Cl | 0.036 | 0.3 | 99 | 0.87 | 92.9 | 23.4 |
| Comparative Example 14 | 0.120 | Hydrogen | 0.036 | 0.3 | 53 | 1.32 | 93.0 | 23.3 |
| Comparative Example 15 | 0.120 | Dimethyl thioether | 0.036 | 0.3 | 50 | 1.73 | 93.0 | 23.4 |
| Comparative Example 6 | 0.120 | — | 0 | 0 | 99 | 2.06 | 93.0 | 23.3 |

It can be seen from Table 7 that when hydrogen or dimethylthioether is added, the polymerization activity is greatly lowered, while the addition of diethylaluminum chloride does not result in the lowering of polymerization activity.

What is claimed is:

1. A process for preparing 1,2-polybutadiene with a vinyl content of at least 70% by contacting 1,3-butadiene with a catalyst consisting of (A) a cobalt compound, (B) an organic phosphine compound, (C) a trialkylaluminum compound and (D) water in an amount of 0.1 to 1.2 moles per mole of said trialkylaluminum in the presence of a molecular weight regulator, characterized in that as the molecular weight regulator, (E) an alkylaluminum halide compound is allowed to be present in the reaction system in an amount of at least 0.01 mole per mole of the trialkylaluminum compound (C).

2. A process according to claim 1, wherein the alkylaluminum halide compound (E) is added in an amount of 0.01–1.5 mole per mole of the trialkylaluminum (C).

3. A process according to claim 1, wherein the alkylaluminum halide compound (E) is added in an amount of 0.05–1.0 mole per mole of the trialkylaluminum (C).

4. A process according to claim 1, 2 or 3, wherein the alkylaluminum halide compound (E) is a compound represented by the formula: AlR$_{3-n}$X$_n$ (wherein R is an alkyl group, X is a halogen, and n is a number defined by $1 \leq n \leq 2$).

5. A process according to claim 1, 2 or 3, wherein the alkylaluminum halide compound (E) is dimethylaluminum chloride, diethyaluminum chloride, diethylaluminum bromide, diethylaluminum iodide, diisobutylaluminum chloride, dihexylaluminum chloride, ethylaluminum sesquichloride, ethylaluminum sesquibromide, ethylaluminum dichloride or ethylaluminum dibromide.

6. A process according to claim 1, 2 or 3, wherein the alkylaluminum halide compound (E) is diethylaluminum chloride, ethylaluminum sesquichloride or ethylaluminum dichloride.

* * * * *